US010748095B2

(12) United States Patent
Diao et al.

(10) Patent No.: US 10,748,095 B2
(45) Date of Patent: Aug. 18, 2020

(54) AUTOMATED TELLER MACHINE FLOW NETWORK AND CONTROL SYSTEM

(71) Applicant: International Business Machines Corporation, Armonk, NY (US)

(72) Inventors: Yixin Diao, White Plains, NY (US); Ea-Ee Jan, Ardsley, NY (US); Soumitra Sarkar, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 918 days.

(21) Appl. No.: 15/136,208

(22) Filed: Apr. 22, 2016

(65) Prior Publication Data

US 2017/0308835 A1 Oct. 26, 2017

(51) Int. Cl.
G06Q 10/06 (2012.01)
G07F 19/00 (2006.01)
G06Q 20/10 (2012.01)

(52) U.S. Cl.
CPC ... G06Q 10/06315 (2013.01); G06Q 20/1085 (2013.01); G07F 19/209 (2013.01)

(58) Field of Classification Search
None
See application file for complete search history.

(56) References Cited

U.S. PATENT DOCUMENTS 5,799,288 A * 8/1998 Tanaka ............... G06Q 20/108
705/43
5,900,607 A * 5/1999 Awatsu .............. G06Q 20/1085
235/379

(Continued)

FOREIGN PATENT DOCUMENTS

WO 2013114125 A2 8/2013
WO 2013140413 A2 9/2013
WO 2014097011 A1 6/2014

OTHER PUBLICATIONS

Broda, P. and Levajkovic, T. and Kresoja, M. and Marceta, M. and Mena. H and Nokolic, M and Stojancevic, T. Optimization of ATM filling-in with Cash. 99th European Study Group with Industry (ESGI 99), 2014. (Year: 2014).*

(Continued)

*Primary Examiner* — Stephanie Z Delich
(74) *Attorney, Agent, or Firm* — Scully, Scott, Murphy & Presser, P.C.; JoAnn Kealy Crockatt

(57) ABSTRACT

Automatic teller machine network management control system executes a deterministic optimization process based on a deterministic forecasted withdrawal demand to determine a cash refill amount, and executes a stochastic simulation process to determine an overall automatic teller machine network management cost based on a stochastic forecasted withdrawal demand and the cash refill amount. The executing of the deterministic optimization process and the executing of the stochastic simulation process are iterated based on updated scaling parameter from the stochastic simulation process and the cash refill amount determined by the deterministic optimization process at current iteration until a termination threshold is met. A target scaling parameter that minimizes the overall automatic teller machine network management cost out of all iterations is determined, and target cash refill amount and time specification for refilling the automatic teller machine are determined based on executing the deterministic optimization process with the target scaling parameter.

19 Claims, 9 Drawing Sheets

(56) References Cited

U.S. PATENT DOCUMENTS

| | | | | |
|---|---|---|---|---|
| 6,304,812 | B1* | 10/2001 | Kolmanovsky | F01N 3/0842 701/103 |
| 7,537,153 | B2* | 5/2009 | Hurwitz | G06Q 10/087 235/379 |
| 7,912,748 | B1* | 3/2011 | Rosenberg | G06Q 10/087 705/1.1 |
| 7,946,474 | B1* | 5/2011 | Agrawal | G06Q 10/04 235/376 |
| 8,639,622 | B1* | 1/2014 | Moore | G06Q 20/405 705/35 |
| 9,747,618 | B1* | 8/2017 | Reiss | G06Q 30/0275 |
| 9,905,086 | B1* | 2/2018 | Phillips | G07F 19/209 |
| 2004/0030622 | A1* | 2/2004 | Ramos | G06Q 10/08 705/35 |
| 2004/0217162 | A1* | 11/2004 | Chigira | G06Q 10/08 235/379 |
| 2005/0004856 | A1 | 1/2005 | Brose et al. | |
| 2007/0187485 | A1* | 8/2007 | Aas | G06Q 20/1085 235/379 |
| 2010/0299244 | A1 | 11/2010 | Williams, III | |
| 2012/0109791 | A1 | 5/2012 | Cash | |
| 2015/0051731 | A1* | 2/2015 | Neilan | G07D 11/245 700/244 |
| 2015/0178670 | A1* | 6/2015 | Angus | G06Q 10/087 705/28 |
| 2015/0332274 | A1 | 11/2015 | Prodam et al. | |

OTHER PUBLICATIONS

June Young Jung, Gary Blau, Joseph Pekny, Gintaras, Reklaitis, and David Eversdyk. A Simulation based Optimization Approach to Supply Chain Management Under Demand Uncertainty. Computers and Chemical Engineering 28 (2004), pp. 2087-2106. (Year: 2004).*

Fernando Mele, Gonzalo Guillen, Antonio Espuna, and Luis Puigjaner. A Simulation based Optimization Framework for Parameter Optimization of Supply Chain Networks. Ind. Eng. Chem. Res. 2006, 45, p. 3133-3148. (Year: 2006).*

Armenise, R., et al., "Optimizing ATM Cash Management by Genetic Algorithms," International Journal of Computer Information Systems and Industrial Management Applications, Dec. 2012, pp. 598-608, vol. 4.

Arora, N., et al., "Approximation Methodology: Managing Cash in Automated Teller Machines using Fuzzy ARTMAP Network," International Journal of Enhanced Research in Science Technology & Engineering, Feb. 2014, pp. 318-326, vol. 3, Issue. 2.

Gubar, E., et al., "Cash Flow Optimization in ATM Network Model," Fourth International Conference on Game Theory and Management, Jun. 2011, pp. 213-222.

Simutis, R., et al., "Optimization of Cash Management for ATM Network," Information Technology and Control, May 2007, pp. 117-121, vol. 36, No. 1A.

Toro-Diaz, H.H., et al; "Stochastic Optimization of a Cash Supply Chain", Production Systems and Supply Chain Management in Emerging Countries: Best Practices, Mar. 13, 2012, pp. 183-199, Chapter 10.

* cited by examiner

AUTOMATED TELLER MACHINE FLOW NETWORK AND CONTROL SYSTEM

FIELD

The present application relates generally to computers and computer applications, and more particularly to Automated Teller Machine (ATM) flow network and control system.

BACKGROUND

The arrival of the Internet of Things represents a transformation shift and opens a range of new opportunities. Automated Teller Machine (ATM) service providers are faced with challenges of improving the quality of customer service while reducing the cost of cash flow management, for example, to effectively balance the need to have enough cash in the ATMs to avoid out-of-cash incidents as well as to reduce the cash interest cost and the cash refill cost. Existing work on ATM cash flow management is mainly based on deterministic models which do not explicitly consider the stochastic behavior exhibited in the cash withdrawal demand, for example, that impacts the ATM operating cost.

BRIEF SUMMARY

A system, method, computer program product, and/or techniques may be provided, which optimize an automatic teller machine network flow. A system that controls an automatic teller machine flow network, in one aspect, may include one or more hardware processors operable to receive signals comprising a deterministic forecasted withdrawal demand and a stochastic forecasted withdrawal demand at an automatic teller machine. One or more of the hardware processors may be further operable to execute a deterministic optimization process at least based on the deterministic forecasted withdrawal demand to determine a cash refill amount that minimizes cash interest cost and cash refill cost subject to a plurality of constraints. The plurality of constraints may include at least a cash availability constraint as a function of a scaling parameter that represents a safety margin against an out-of-cash incident. One or more of the hardware processors may be further operable to execute a stochastic simulation process to determine an overall automatic teller machine network management cost at least based on the stochastic forecasted withdrawal demand and the cash refill amount determined by the deterministic optimization process. One or more of the hardware processors may be further operable to update the scaling parameter and feed the updated scaling parameter to the deterministic optimization process, and iterate executing of the deterministic optimization process based on the updated scaling parameter and executing of the stochastic simulation process based on the cash refill amount determined by the deterministic optimization process at current iteration until a termination threshold is met. One or more of the hardware processors may be further operable to find a target scaling parameter that minimizes the overall automatic teller machine network management cost out of all iterations. One or more of the hardware processors may be further operable to determine target cash refill amount and time for refilling the automatic teller machine in a given period of time, based on executing the deterministic optimization process executed based on the target scaling parameter. One or more of the hardware processors may be further operable to transmit a signal to cause the automatic teller machine to be refilled automatically according to the target cash refill amount and time for refilling.

A method of providing automatic teller machine network management control, in one aspect, may include receiving signals comprising a deterministic forecasted withdrawal demand and a stochastic forecasted withdrawal demand at an automatic teller machine. The method may also include executing a deterministic optimization process at least based on the deterministic forecasted withdrawal demand to determine a cash refill amount that minimizes cash interest cost and cash refill cost subject to a plurality of constraints. The plurality of constraints may include at least a cash availability constraint as a function of a scaling parameter that represents a safety margin against an out-of-cash incident. The method may also include executing a stochastic simulation process to determine an overall automatic teller machine network management cost at least based on the stochastic forecasted withdrawal demand and the cash refill amount determined by the deterministic optimization process. The method may also include updating the scaling parameter and feeding the updated scaling parameter to the deterministic optimization process. The method may further include iterating the executing of the deterministic optimization process based on the updated scaling parameter and the executing of the stochastic simulation process based on the cash refill amount determined by the deterministic optimization process at current iteration until a termination threshold is met. The method may also include determining a target scaling parameter that minimizes the overall automatic teller machine network management cost out of all iterations. The method may further include determining target cash refill amount and time for refilling the automatic teller machine in a given period of time, based on executing the deterministic optimization process with the target scaling parameter. The method may also include transmitting a signal to cause the automatic teller machine to be refilled automatically according to the target cash refill amount and time for refilling.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method, computer program product and/or techniques may be provided for a framework that automates the ATM cash flow network, for example, in an optimal manner. The framework in one embodiment may automatically and efficient refill the ATM machines in a manner that minimizes the operating cost while improving the customer service. In one aspect, a methodology of the present disclosure addresses both the deterministic and the stochastic nature of ATM cash flow optimization, for example, and may implement a cascaded optimization framework for solving the ATM cash flow problem.

Figure 1:
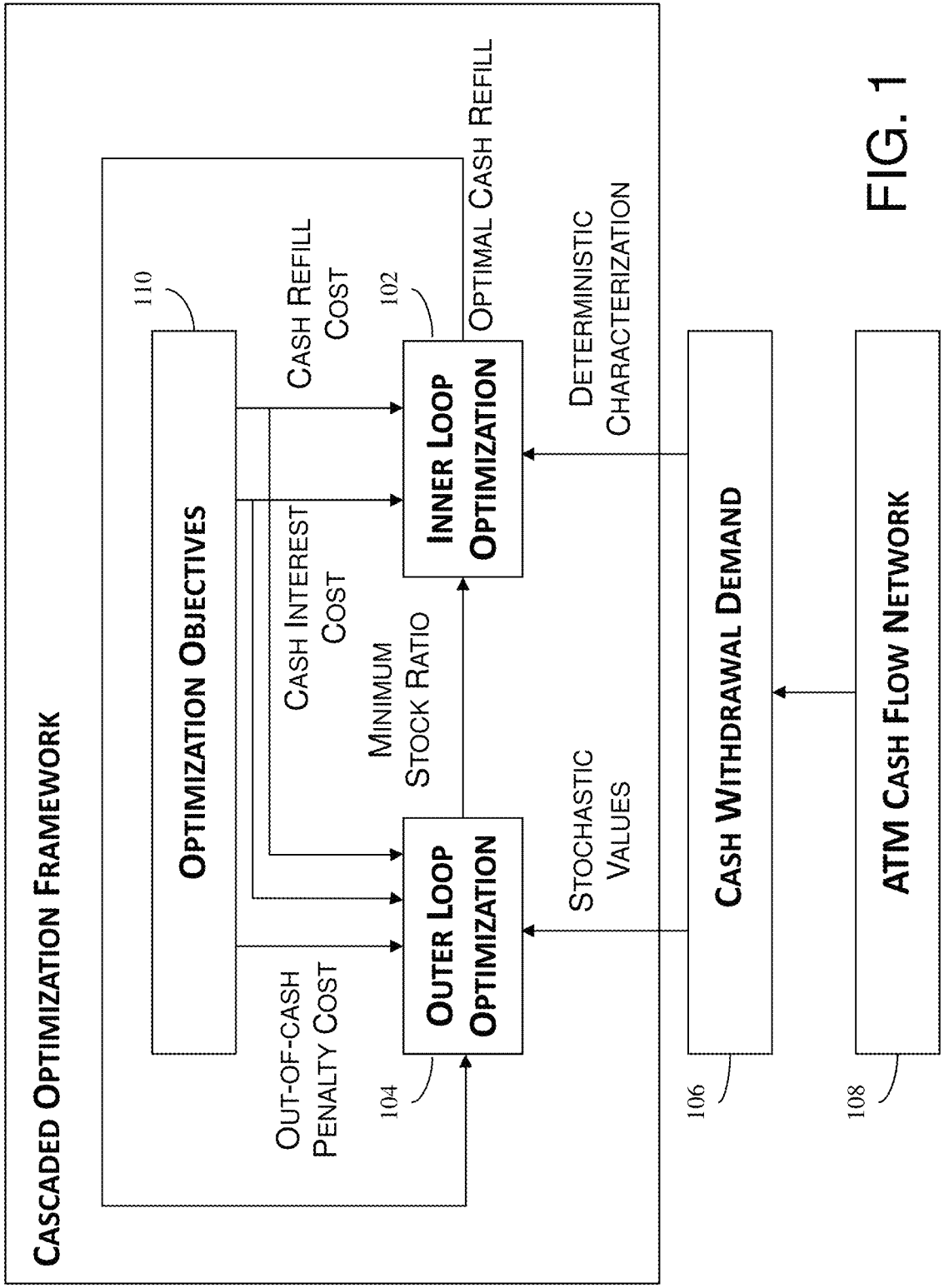
FIG. 1 is a diagram illustrating ATM cash flow optimization architecture in one embodiment of the present disclosure.

FIG. 1 is a diagram illustrating ATM cash flow optimization architecture in one embodiment of the present disclosure. A cascaded optimization framework in one embodiment of the present disclosure may include an inner loop optimization module 102 and an outer loop optimization module 104, for example, processor or processing components that execute on one or more hardware processors. Optimization objectives 110 of the framework may include minimizing the total of cash interest cost, cash refill cost and out-of cash penalty cost. The inner loop optimization module 102 may handle deterministic cash interest and cash refill costs, and the outer loop optimization module 104 may handle stochastic cash interest, cash refill, and out-of-cash penalty costs. The methodology of the present disclosure in one embodiment may integrate a cash demand forecasting model that determines the expected cash demand, for example, used in the optimization. A user friendly tooling environment may be also provided for ease of use.

The inner loop optimization module 102 in one embodiment may minimize the cash interest cost (the interest to be paid for idle cash) and the cash refill cost (the operating cost for ATM refill trips). Both are highly related to the deterministic characterization of the cash withdrawal demand (e.g., the mean value of cash withdrawal) but less sensitive to its stochastic behaviors. The outer loop optimization module 104 takes a holistic view of all ATM cash flow management cost. Addition to the cash interest cost and the cash refill cost, outer loop optimization module 104 may also include the out-of-cash penalty cost (the cost that occurs when no sufficient cash is available in the ATM to meet the customer's cash withdrawal demand) which is more sensitive to the stochastic behavior of the ATM cash withdrawal demand. In one embodiment, the output of outer loop optimization 104 is the minimum stock ratio that represents the trade-off needed on having excessive cash, which is passed or fed back to the inner loop optimization 102 to recommend the optimal cash refill amount and schedule.

The cascaded optimization framework in one embodiment not only considers all ATM cash flow management costs in a unified manner but also handles its deterministic and stochastic nature separately in order to improve the computational effectiveness. For example, the cascaded optimization framework in one embodiment employs linear integer programming in the inner loop optimization 102 to find out the strictly optimal solution based on the deterministic characterization of the cash withdrawal demand, and deploys the simulation-optimization approach in the outer loop optimization 104 based on the stochastic values of cash withdrawal.

In one embodiment, inner loop optimization model 102 that minimizes the cash interest cost and the cash refill cost using a linear integer programming method may be defined for the cascaded optimization framework. The outer loop optimization model 104 in one embodiment adds the consideration of the out-of-cash penalty cost and addresses the stochastic behavior through a simulation-optimization approach. Table 1 lists notations used in the ATM cash flow optimization models in one embodiment of the present disclosure.

TABLE 1

| | |
|---|---|
| m = 1, 2, . . . , M | Set of ATM machines |
| t = 1, 2, . . . , T | Set of days for cash flow optimization |
| w(m, t) | Expected amount of cash withdrawal from the m -th ATM during the t -th day |
| x(m, t) | Amount of cash refill for the m -th ATM at the beginning of the t -th day |
| s(m, t) | Amount of cash stock level of the m -th ATM at the end of the t -th day |
| d(m, t) | Standard deviation of cash withdrawal expectation from the m -th ATM during the t -th day |
| y(m, t) | 1 if the m-th ATM is refilled on the t-th day 0 otherwise |
| $\tilde{w}$(m, t) | Stochastic variable for cash withdrawal from the m -th ATM during the t -th day |
| $\tilde{s}$(m, t) | Stochastic variable for cash stock level of the m -th ATM at the end of the t -th day |
| $\tilde{y}$(m, t) | 1 if the m-th ATM is refilled on the t-th day 0 otherwise |
| $\tilde{z}$(m, t) | 1 if an out-of-cash incident occurs for the m-th ATM on the t-th day 0 otherwise |
| $C_S$ | Daily interest rate for the idle cash |
| $C_Y$ | Refill rate per ATM refill trip |
| $C_Z$ | Penalty rate per out-of-cash incident |
| $S_m^0$ | Initial cash stock level for the m -th ATM |
| B(t) | Total cash refill budget for the t -th day |
| C(m) | Cash capacity for the m -th ATM |
| α | Minimum stock ratio |
| N | Big (positive) number |

Inner Loop Optimization

Let m=1, 2, . . . , M denote the set of ATM machines to be managed and t=1, 2, . . . , T denote the days in the time horizon for cash flow optimization. In one embodiment, ATM cash flow management is a continuous and iterative process where the cash refill decisions are made periodically (e.g., weekly) based on the forecasted cash withdrawal in the near future (e.g., the next T days), for example, shown at 106 in FIG. 1. In one embodiment, the forecast cycle T may be chosen to be longer than the execution cycle in order to have a longer term perspective in optimization.

In one embodiment, w(m,t) is defined to represent the expected customer cash withdrawal from the m-th ATM machine during the t-th day. The value of w(m,t) can be obtained from a cash withdrawal demand forecasting model. For example, existing forecasting techniques may be employed to determine a cash withdrawal demand 106, for example, based on historical data provided by an ATM cash flow network 108. In one embodiment, x(m,t) may be defined to represent the amount of bank cash refill for the m-th ATM machine at the beginning of the t-th day, and s(m,t) to represent the cash stock level of the m-th ATM machine at the end of the t-th day. In one embodiment, the end of the t-th day is the same as the beginning of the (t+1)-th day, at which the cash refill action takes place.

In one embodiment, the methodology of the present disclosure may formulate the inner loop optimization model as a linear integer programming problem.

$$\min C_S \sum_{m=1}^{M} \sum_{t=1}^{T} s(m,t) + C_Y \sum_{m=1}^{M} \sum_{t=1}^{T} y(m,t) \quad (1)$$

s.t.

$$s(m,t) = s_m^0 + \sum_{\tau=1}^{t} (x(m,\tau) - w(m,\tau)), \forall m, t \quad (2)$$

$$\sum_{m=1}^{M} x(m,t) \leq B(t), \forall t \quad (3)$$

$$s(m,t) \geq \alpha d(m,t), \forall m, t \quad (4)$$

$$s(m,t-1) + x(m,t) \leq C(m), \forall m, t \quad (5)$$

$$x(m,t) \leq Ny(m,t), \forall m, t \quad (6)$$

Equation (1) defines the cost function as to minimize the interest cost of excessive ATM cash stock levels and the refill cost of visiting the ATM machines. $C_S$ denotes the daily interest rate for the idle cash. $C_Y$ denotes the refill rate per ATM refill trip, regardless of the refill amount.

In one embodiment, the methodology of the present disclosure introduces y(m,t) as a 0-1 variable to indicate whether a cash refill is scheduled for the m-th ATM machine on the t-th day. It takes the value 1 only if there is a cash refill operation (i.e., x(m,t)>0). In this case, the refill trip cost $C_Y$ will be added to the overall cost. The use of the 0-1 variable y(m,t) is a general approach for preserving the linearity of problem formulation when logical constraints are considered. The total interest and refill cost is summed over all ATMs from all days in the optimization horizon.

The methodology of the present disclosure in one embodiment considers the following types of constraints: (i) cash stock constraints, (ii) cash budget constraints, (iii) cash availability constraints, (iv) ATM capacity constraints, and (v) cash refill schedule constraints.

Cash Stock Constraints, as defined in Equation (2) in one embodiment, are equality constraints revealing how the periodic (e.g., daily) cash stock levels are affected by the periodic (e.g., daily cash refill) and the periodic (e.g., daily) cash withdrawal. In this disclosure, $s_m^0$ is used to define the cash stock level at the end of the current day (e.g., the start of the optimization horizon).

Cash Budget Constraints, as defined in Equation (3) in one embodiment, represent inequality constraints that limit the periodic (e.g., daily) cash refill for all ATMs. In this disclosure, B(t) is defined as the total cash budget that the bank or like institution can use to refill the ATMs on the t-th day. The budget can be different for different days. For example, the bank may choose to not refill the ATMs on Sundays and holidays. The budget constraints can also be used to represent the limitation of the cash refill process. For example, the cash budgets may be equal among the weekdays reflecting a fixed fleet of cash refill trucks.

The methodology of the present disclosure in one embodiment defines Cash Availability Constraints in Equation (4) for maintaining minimum stock levels in order to avoid the out-of-cash incidents. Since cash withdrawal is a stochastic process, the methodology may define the minimum limit as proportional to d(m,t), the standard deviation of the expected cash withdrawal. This can be obtained by comparing the difference between the expected cash withdrawal value w(m,t) from the forecasting model and the observed cash withdrawal amount from the historical data. Furthermore, the methodology of the present disclosure in one embodiment may define a scaling parameter (minimum stock ratio), $\alpha$, to represent the safety margin against the out-of-cash incidents. The larger the value of $\alpha$, the higher the cash stock level and the less likely the ATM will run out of cash for customer cash withdrawal. In one embodiment, the selection of the right value for a is determined in the outer loop optimization that balances the out-of-cash penalty and the cash refill operation cost.

The methodology of the present disclosure in one embodiment also may define ATM Capacity Constraints in Equation (5) to ensure that each bank cash refill does not exceed the ATM capacity C(m), which may be different for different ATMs.

The methodology of the present disclosure in one embodiment further may define Cash Refill Schedule Constraints to model the effect of the cash refill schedule on the cost function. Equation (6), where N is a big (positive) number, forces the 0-1 variable y(m,t) to take the value of 1 only if a cash refill is scheduled. More specifically, if a cash refill is not scheduled, this means x(m,t)=0. Thus, to satisfy the cash refill constraint and minimize the cash refill cost in Equation (1), y(m,t) can only take the value 0. Alternatively, if a cash refill is scheduled, that is, x(m,t)>0, y(m,t) is forced to take the value of 1 in order to satisfy the constraint.

In one embodiment, with the cost function and constraints as defined above, the inner loop optimization may be formulated as a linear integer programming problem, which can be solved to optimality, for example, using a branch and bound, branch and cut, or branch and price technique. These techniques refine the feasible region, set constraints, or both, so that the optimal solution is identified. Other techniques may be employed to solve the optimization problem. In one aspect, the optimization need not run in real time, thereby providing savings in the cost of computation.

Figure 2:
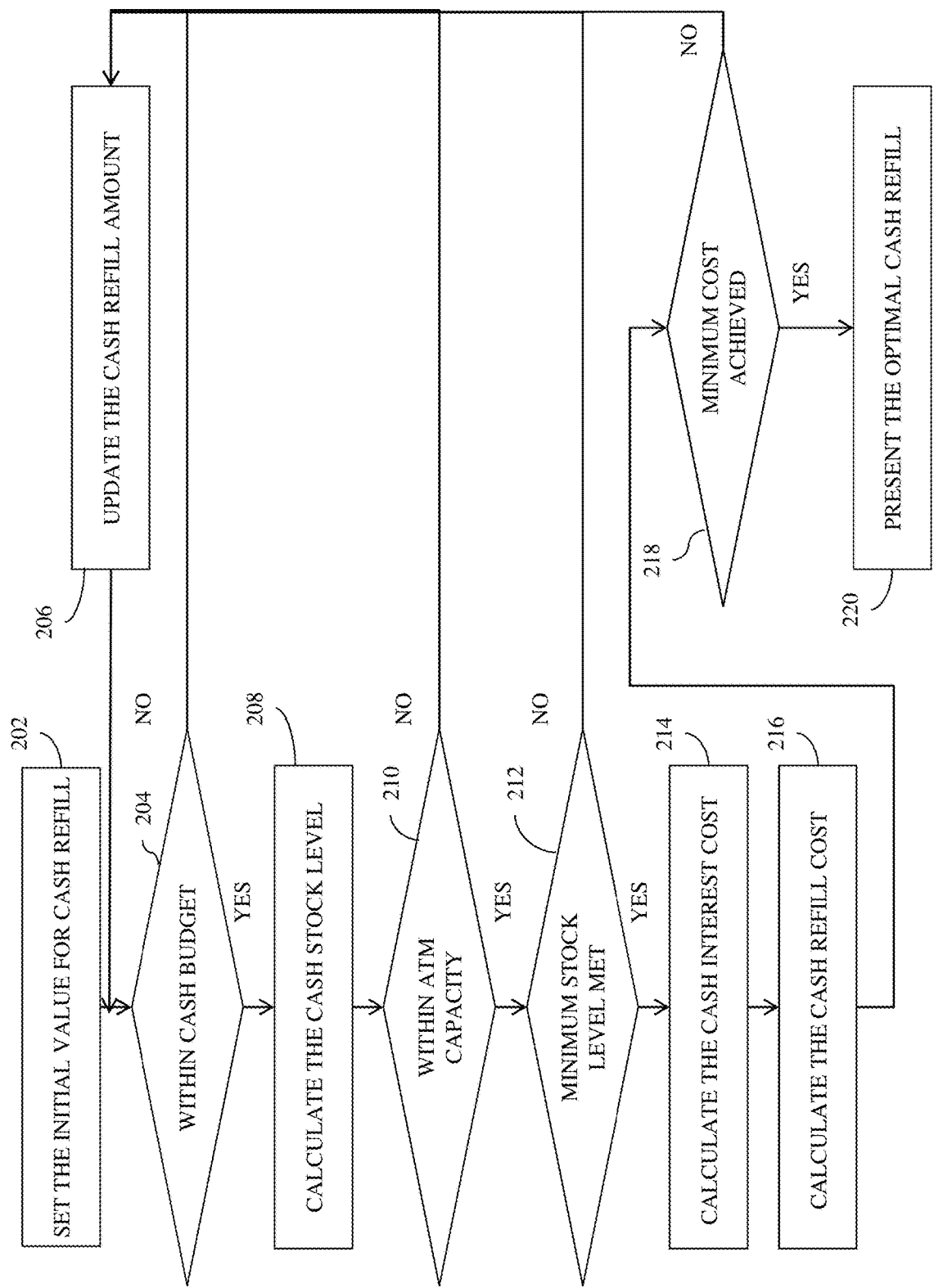
FIG. 2 is a flow diagram illustrating an inner loop optimization in one embodiment.

FIG. 2 is a flow diagram illustrating an inner loop optimization in one embodiment. At 202, an initial value for cash refill may be set. At 204, it is determined as to whether the cash refill value is within cash budget. If the cash refill value is not within the cash budget, the cash refill amount is updated at 206 and the logic of the method returns to 204. If at 204, the cash refill value is within cash budget, at 208, the cash stock level is determined. At 210, it is determined as to whether the cash stock level is within ATM capacity. If the cash stock level is not within ATM capacity, the cash refill amount is updated at 206 and the logic of the method returns to 204. At 212, it is determined as to whether minimum stock level is met. If the minimum stock level is not met, the cash refill amount is updated at 206 and the logic of the method returns to 204. If at 212, if the minimum stock level is met, at 214, cash interest cost is determined. At 216, the cash refill cost is determined. At 218, it is determined whether the cash interest cost and the cash refill cost is at the minimum. If at 218, it is determined that the minimum cost is achieved, the cash refill amount is presented at 220 as an optimal cash refill. If at 218, it is determined that the minimum cost has not been achieved, the cash refill amount is updated at 206 and the logic of the method returns to 204.

The method shown in FIG. 2 may be performed for all defined time periods and ATM machines, by solving a minimization cost function of equation (1) subject to the constraints shown in equations (2)-(6).

Outer Loop Optimization

The inner loop optimization (e.g., shown in FIG. 1 at 102 and FIG. 2) in one embodiment addresses the deterministic behavior of ATM cash flow optimization; it minimizes the cash interest cost and the cash refill cost while modeling the cash withdrawal as a deterministic variable w(m,t) (e.g., the expected value). The outer loop optimization (e.g., FIG. 1 at 104) in one embodiment addresses the stochastic nature of ATM cash flow optimization by modeling the cash withdrawal as a random variable $\tilde{w}(m,t)$.

An embodiment of the methodology of the present disclosure may implement a simulation-optimization approach that runs the Monte Carlo simulation based on different stochastic values of $\tilde{w}(m,t)$, where the cash refill amount x(m,t) is fixed from the inner loop optimization. The methodology of the present disclosure in one embodiment runs the line search optimization strategy that finds the optimal α to minimize the overall ATM cash management cost.

In one embodiment, the overall ATM cash management cost may be defined as $$C_S \sum_{m=1}^{M} \sum_{t=1}^{T} \tilde{s}(m, t) + C_Y \sum_{m=1}^{M} \sum_{t=1}^{T} \tilde{y}(m, t) + C_Z \sum_{m=1}^{M} \sum_{t=1}^{T} \tilde{z}(m, t) \quad (7)$$

which adds the out-of-cash penalty cost (the third term) on top of the cash interest cost and the cash refill cost (the first two terms) that appear in the inner loop cost function Equation (1). In one embodiment, the $\tilde{s}(m,t)$, $\tilde{y}(m,t)$, and $\tilde{z}(m,t)$ in Equation (7) are random variables, whose values depend on the stochastic values of $\tilde{w}(m,t)$ in the Monte Carlo simulation. The Monte Carlo simulation minimizes the average cost computed from Equation (7).

Similar to y(m,t), the methodology of the present disclosure in one embodiment may introduce $\tilde{z}(m,t)$ as a 0-1 variable to indicate whether an out-of-cash incident occurs for the m-th ATM machine on the t-th day. It takes the value 1 if there is an out-of-cash incident (i.e., $\tilde{s}(m,t)<0$), and the value 0 if otherwise (i.e., $\tilde{s}(m,t)\geq 0$). $C_Z$ may be denoted as the penalty cost per out-of-cash incident. Thus, in the case when an out-of-cash incident occurs (i.e., $\tilde{z}(m,t)=1$), the out-of-cash penalty cost $C_Z$ will be added to the overall ATM cash management cost.

Figure 3:
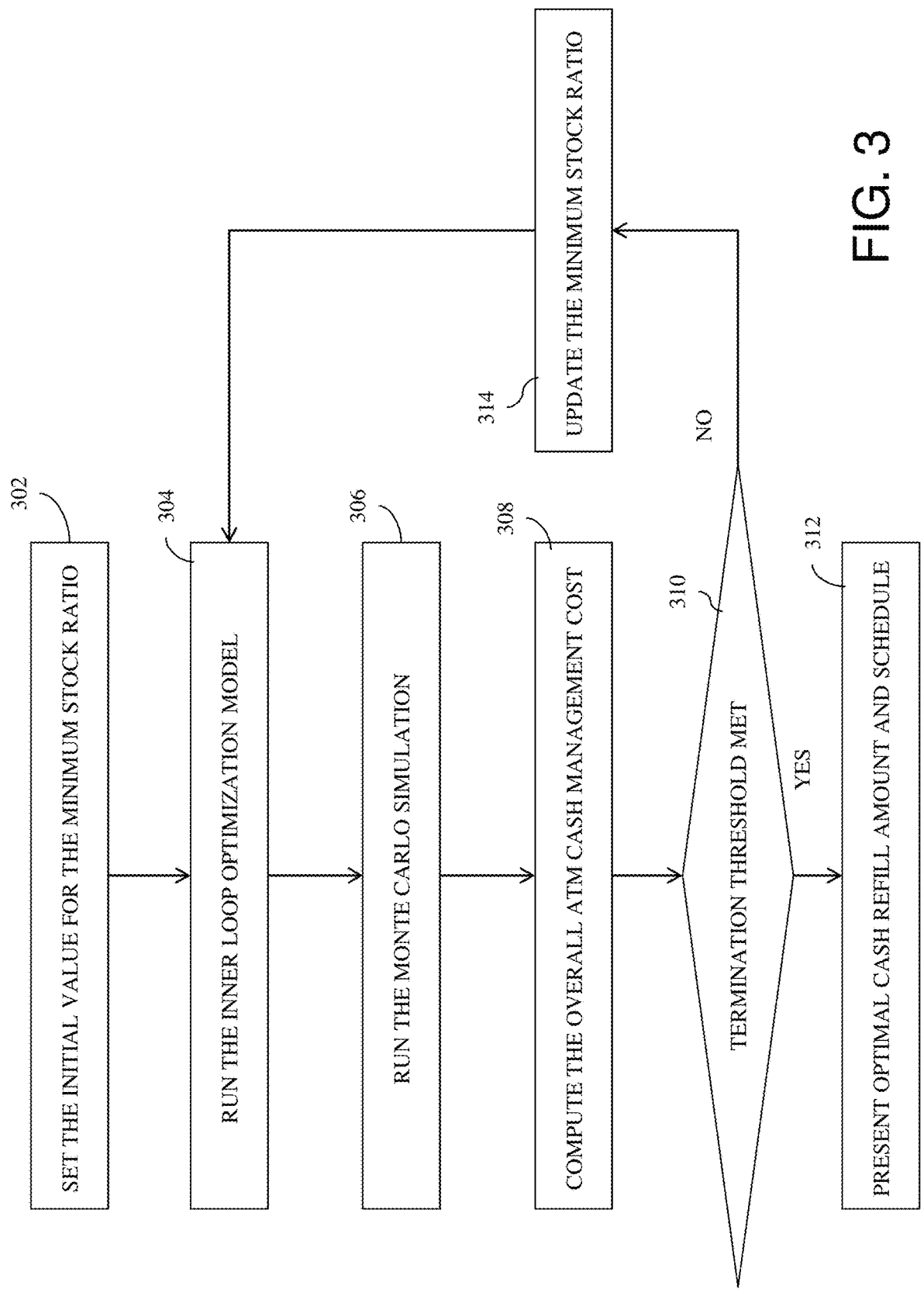
FIG. 3 is a flow diagram illustrating a method of performing outer loop optimization in one embodiment of the present disclosure.

The outer loop optimization model operates as follows:

FIG. 3 is a flow diagram illustrating a method of performing outer loop optimization in one embodiment of the present disclosure. At 302, the initial value for the minimum stock ratio α is set. For example, any positive real number may be chosen as a minimum stock ratio α. In one embodiment, this minimum stock ratio α set in the outer loop optimization is used in running the inner loop optimization. At 304, the inner loop optimization model is run, for example, as described in FIG. 2 and Equations (1-6) based on the deterministic characterization of cash withdrawal and the minimum stock ratio α. The inner loop optimization produces the optimal cash refill x(m,t) minimizing the cash interest cost and the cash refill cost subject to the given minimum stock ratio α.

At 306, simulation such as the Monte Carlo simulation is run or executed on one or more hardware processors, based on repeated random values of the cash withdrawal $\tilde{w}(m,t)$ and the fixed cash refill x(m,t) calculated above. In one embodiment, $\tilde{w}(m,t)$ is determined as part of the Monte Carlo simulation by using a different set of possible random values. The possible values may be obtained from a probability distribution function of the cash withdrawal, for example, if such a function is available; in another aspect, the values may be randomly drawn from the possible range of observed cash withdrawal in the historical data. In one embodiment, w(m,t) used in Equations (1)-(6) is the expected value or average value of all possible $\tilde{w}(m,t)$. At 308, the simulation results are used to compute the overall ATM cash management cost, for example, as defined in Equation (7).

At 310, it is determined whether a termination threshold is met. In one embodiment, the termination threshold may be defined as a minimum decreasing threshold. For example, if the sum of the cash interest cost, cash refill cost and out-of-cash penalty cost has minimum changes over consecutive simulation runs performed (e.g., less than one percent of the sum), the termination threshold is determined to be met. If the termination threshold is met, the cash refill amount (e.g., x(m,t)) and schedule (e.g., y(m,t)) are presented at 312. For example, the solution or decision variables determined by running the inner loop optimization with the current iteration's stock ratio value are presented. If at 310, it is determined that the termination threshold is not met, at 314 the minimum stock ratio may be updated. For example, in one embodiment, update value for the minimum stock ratio may be determined using the line search strategy such as a gradient descent, Newton's method, or Quasi-Newton method to determine the increase or decrease.

Figure 4:
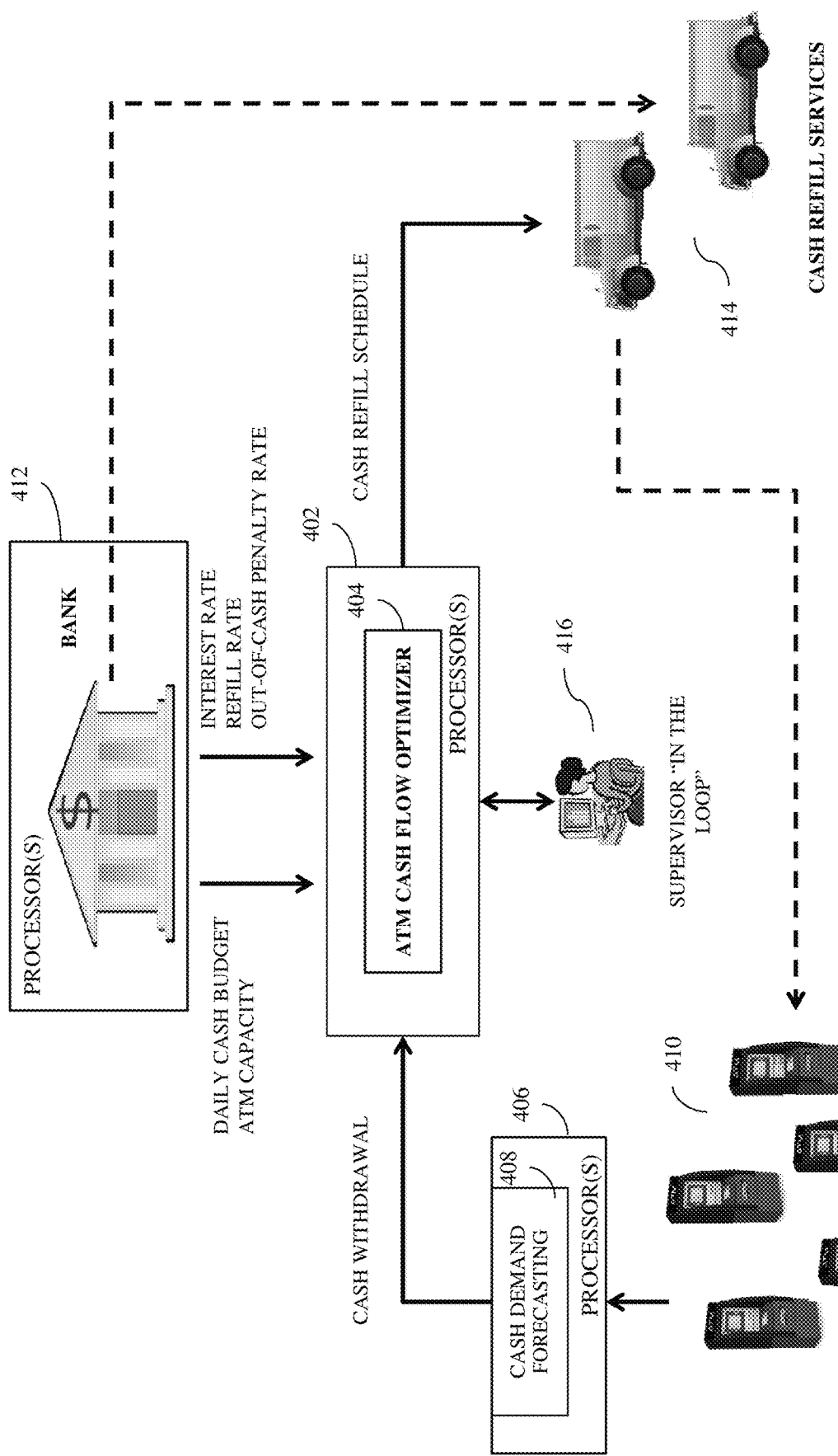
FIG. 4 shows system architecture in one embodiment for a cash flow management device.

FIG. 4 shows system architecture in one embodiment for a cash flow management device. One or more computer processors 402 may implement ATM cash flow optimizer 404 and execute for example, the optimization framework methodology described above. One or more processors 406 may implement cash demand forecasting 408, for example, based on historic data from a network of ATM 410. The ATM cash flow optimizer 404 receives the cash demand forecasts, for example, deterministic and stochastic from one or more processors 406 running the cash demand forecasting 408, and parameters such as daily cash budget, ATM capacity, interest rate, refill rate, and out-of-cash penalty rate from one or more processors 412, for example, running a banking or like system, for instance, in the form of transmission signals. The ATM cash flow optimizer 404 based on the input, determines a cash refill amount for the ATMs 410 and a schedule for filling the ATMs 410. In one embodiment, the ATM cash flow optimizer via a scheduling process sends scheduling signals over a network interface to schedule and control one or more cash delivery vehicles 414 to refill a cash repository with enough cash to meat the total cash withdrawal demand, for example, with minimum cost as determined by the ATM cash flow optimizer 404. In one embodiment, a user interface 416 may be provided for allowing a user to interact with the optimization flow and view results, and/or for example, to provide an optional ability to change parameters of automatic optimization.

In one embodiment, a deterministic process may dynamically determine a deterministic cash withdrawal demand from the deterministic behavior inputs defining one or more users. In one embodiment, a stochastic process may dynamically determine a stochastic cash withdrawal demand from the stochastic inputs defining one or more of the users. In one embodiment, the deterministic behavior inputs may include one or more of the following: location of user, capacity of the ATM, bank budget of available cash for ATM refill, typical amount of cash withdrawal. The stochastic inputs in one embodiment may include one or more of the following: location of user, actual amount of cash withdrawal, unscheduled emergency cash refill trip. In one embodiment, an extrinsic event input such as interest rate signal, refill rate signal, out-of-cash penalty rate signal, may be received to determine the total cash withdrawal demand to optimize the trade-off needed on having excessive cash, e.g. minimizing penalties, minimizing interest rate payment, minimizing scheduled and unscheduled cash refill trip and cost. The determined deterministic cash withdrawal demand may be input to the inner loop optimization and the determined stochastic cash withdrawal demand may be input to the outer loop optimization, in one embodiment of the present disclosure.

The following describes a use case example in one embodiment of the present disclosure. While a large commercial bank or like institution may have a large number of ATMs, for example, in the hundreds or thousands, and the methodology may be implemented for such large network of ATMs, an example scenario is described with reference to 5 ATM machines for simplicity of explanation.

Table 2 shows an example of the expected cash withdrawal amount (in the unit of thousand dollars, $K) from 5 ATM machines within a time period, for example, the next 10 days. The expected cash withdrawal amount in one embodiment are obtained from a cash withdrawal demand forecasting model. Such a model can be built using different techniques such as time series analysis or neural network models, which may be available a priori. In this example scenario, the initial cash stock level $S_m^0$ (e.g., in the unit of thousand dollars $K in this example) is set at 0 for all ATMs.

In this example, the total cash refill budget B(t) is set at $2 M, which remains constant for different days. While the bank or like institution may be able to provide more cash for ATM operations, it typically sets the budget as low as possible to avoid being idle. In the example shown in Table 2, the total cash demand from 10 days are $9.2 M, that is, an average of $0.92 M per day. However, due to the cash withdrawal fluctuation, a higher budget of $2 M is set and the minimization of cash interest cost together with other costs are carried out by the cash flow optimization model.

In this example, the cash capacity C(m) is set up at $1 M for all ATMs. ATM machines may have large capacity and many of them may be idle in normal days but may be reserved for special occasions.

In this example, with respect to the cost factors, the daily interest rate $C_S$ is set at 8.2e-5 (that is, 3% annual interest rate divided by 365 days), the ATM refill rate $C_r$ at $500 per ATM refill trip, and the out-of-cash penalty rate $C_Z$ at $1,000 per violation. In one aspect, the optimal cash refill amount are affected by the selection of these cost factors since the trade-off needs to be achieved to minimize the overall cost. The values of the above parameters are set for illustrations purposes. The big (positive) number N in this example is set at 1e5 which is used in the linear integer programming to preserve the linearity when the 0-1 variables and logical constraints are used.

TABLE 2

Expected cash withdrawal amount ($K) in an illustrated ATM cash flow network scenario.

|  | ATM 1 | ATM 2 | ATM 3 | ATM 4 | ATM 5 |
|---|---|---|---|---|---|
| Day 1 | 98.45 | 113.12 | 334.81 | 126.87 | 237.51 |
| Day 2 | 215.13 | 134.02 | 504.79 | 107.85 | 491.85 |

TABLE 2-continued

Expected cash withdrawal amount ($K) in an illustrated ATM cash flow network scenario.

|  | ATM 1 | ATM 2 | ATM 3 | ATM 4 | ATM 5 |
|---|---|---|---|---|---|
| Day 3 | 139.75 | 36.38 | 242.91 | 97.30 | 154.80 |
| Day 4 | 141.43 | 85.37 | 223.05 | 109.32 | 174.45 |
| Day 5 | 160.14 | 153.36 | 266.95 | 139.61 | 164.85 |
| Day 6 | 147.97 | 158.51 | 279.61 | 108.10 | 239.65 |
| Day 7 | 95.93 | 64.28 | 231.92 | 137.45 | 178.25 |
| Day 8 | 103.63 | 74.31 | 319.15 | 157.63 | 238.95 |
| Day 9 | 179.92 | 122.88 | 377.65 | 280.11 | 365.35 |
| Day 10 | 114.96 | 48.87 | 202.92 | 119.54 | 172.20 |

In one embodiment, the value of the minimum stock ratio $\alpha$ is determined in the outer loop optimization, for example, as described above. In this example, the minimum stock ratio $\alpha$ is set at 1. For instance, in this example, the value of 1 is used in the outer loop optimization as the initial stock ratio. However, any value may be used. This means the minimum cash stock level of each ATM machine is at least the size of the standard deviation of the cash withdrawal amount for that ATM.

Based on the defined or set values, inner loop optimization is performed, for example, the linear integer programming problem (e.g., of Equations (1)-(6)) using the branch and bound method is solved. Table 3 shows the cash refill amount (in the unit of thousand dollars, $K) for the 5 ATM machines within the next 10 days.

All ATMs are refilled on the first day since all of them have zero initial stock levels. After that, fewer refills are performed but the amount of each refill is targeted to be maximized up to the $2 M daily total cash refill budget. For example, the total cash refill is $1,978K on Day 1 and $1,937K on Day 2. Meanwhile, the cash refill operation is scheduled as latest as possible to avoid excessive cash stock level. For example, there are only 2 refills on Day 2 and no refills on Day 3. All of these help to minimize the cash interest cost and the cash refill cost. At the end the inner loop optimization results in the cash interest cost of $1,424 and the cash refill cost of $6,000 (for a total of 12 cash refill trips). The higher cash refill cost is due to a relatively high per trip rate ($500) and a relatively low interest rate (3% per year). If a lower refill rate or a higher interest rate occurs, a different cost structure is expected resulting from the cash flow optimization with more cash refill trips.

TABLE 3

ATM cash refill amount ($K) calculated from inner loop optimization where minimum stock ratio $\alpha = 1$.

|  | ATM 1 | ATM 2 | ATM 3 | ATM 4 | ATM 5 |
|---|---|---|---|---|---|
| Day 1 | 468 | 284 | 369 | 595 | 262 |
| Day 2 | 0 | 0 | 959 | 0 | 978 |
| Day 3 | 0 | 0 | 0 | 0 | 0 |
| Day 4 | 941 | 712 | 0 | 0 | 0 |
| Day 5 | 0 | 0 | 1676 | 0 | 0 |
| Day 6 | 0 | 0 | 0 | 801 | 1196 |
| Day 7 | 0 | 0 | 0 | 0 | 0 |
| Day 8 | 0 | 0 | 0 | 0 | 0 |
| Day 9 | 0 | 0 | 0 | 0 | 0 |
| Day 10 | 0 | 0 | 0 | 0 | 0 |

Figure 5:
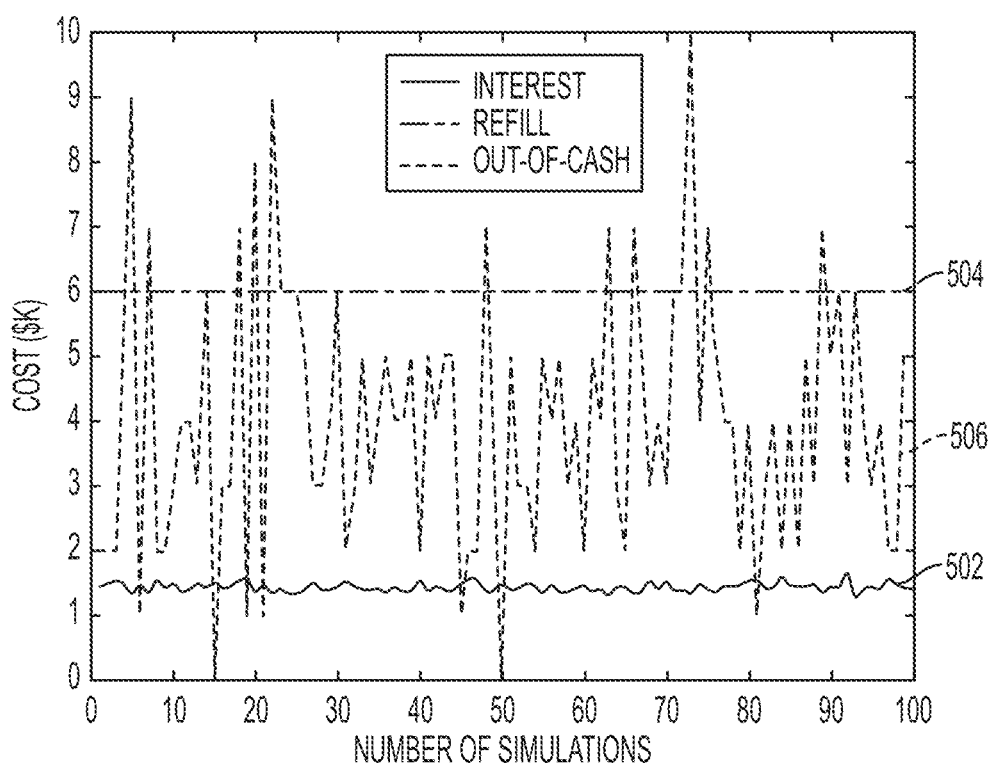
FIG. 5 shows Monte Carlo simulation of ATM cash withdrawal variation and its impact on the cash management cost in the example scenario in one embodiment of the present disclosure.

FIG. 5 shows Monte Carlo simulation of ATM cash withdrawal variation and its impact on the cash management cost in the example scenario in one embodiment of the present disclosure.

In one embodiment, the inner loop optimization operates based on the expected cash withdrawal amount. When the actual cash withdrawal differs from the expectation, the cost values vary too. This is shown in FIG. 5 which represents example simulation results from the Monte Carlo simulation. The x-axis indicates the number of simulations, each of which takes a random set of values of cash withdrawal. In one embodiment, the expected cash withdrawal amount used in the inner loop optimization may be an average value of this random set of values. The y-axis indicates the cash management cost in the unit of thousand dollars ($K). In addition to the cash interest cost and the cash refill cost as considered in the inner loop optimization, the out-of-cash penalty cost is also shown to provide a complete impact of the cash withdrawal variation.

In FIG. 5, the cash interest cost is represented by the solid line 502 in the bottom. It not only has smaller magnitude compared to others (due to a relatively small interest rate), but has smaller variability as well (an indication that the cash interest cost is less sensitive to the cash withdrawal variation). This may be explained by the fact that even if the daily cash stock level may vary considerably according to the randomness in cash withdrawal, such variation may be smoothed out at a collective level across all days.

The cash refill cost is represented by the dashed line 504 at the top in FIG. 5. This is a fixed line since the cash refill amount and schedule is pre-determined by the inner loop optimization and does not vary across different simulations. In this example, the cash refill cost tends to be the dominant cost among the three cost factors due to a higher per trip rate, even if its dominant role may change when a different rate is used.

In FIG. 5, the out-of-cash penalty cost is represented by the dotted line in the middle 506. In this example, large variation is observed, which indicates the number of out-of-cash incidents and thus their penalty cost are highly sensitive to the cash withdrawal variation. This may be explained by the fact that unlike the other two cost factors, the out-of-cash penalty cost is determined by a logical constraint—whether the daily cash stock level is negative or not.

In this example, overall, the average cost across all simulations is $1,434 for the cash interest cost, $6,000 for the cash refill cost, and $4,350 for the out-of-cash penalty cost.

The outer loop optimization in one embodiment operates by iteratively updating the minimum stock ratio $\alpha$, for example, using the line search strategy that leads to the minimum overall ATM cash management cost. During each iteration, the inner loop optimization is run first, which may initially generate a 'sub-optimal' cash refill amount (similar to that in Table 3 but with different $\alpha$), followed by a set of Monte Carlo simulations (similar to that in FIG. 5) where the average cost across all simulation runs is calculated as the performance indicator to drive the minimum stock ratio update. As an example, each set of Monte Carlo simulation is composed of 100 runs. The number may vary, for example, depending on the variability exhibited in the cash withdrawal.

Figure 6:
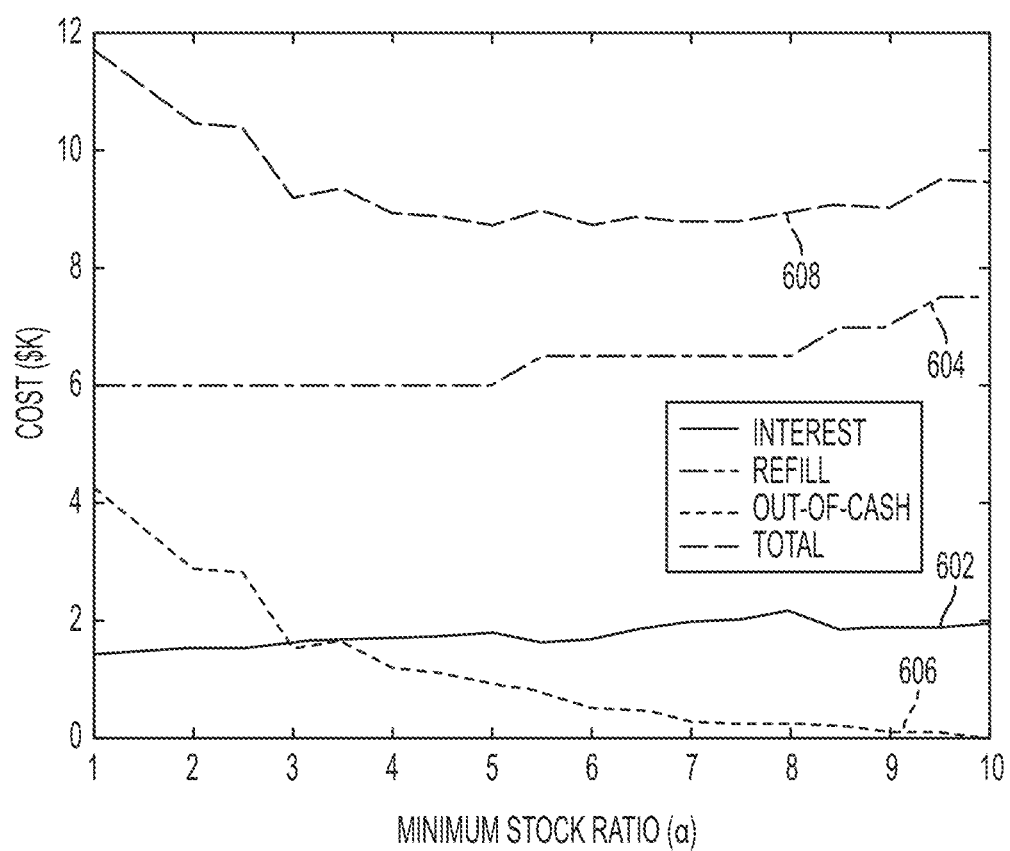
FIG. 6 visualizes the optimization space in one embodiment of the present disclosure, in which the outer loop optimization in an example scenario is navigating.

FIG. 6 visualizes the optimization space in one embodiment of the present disclosure, in which the outer loop optimization in this example is navigating. The x-axis indicates the decision variable (the minimum stock ratio). The y-axis indicates the cost function (in the unit of thousand dollars $K) that the outer loop optimization is set up to minimize. The solid line 602 represents the cash interest cost, which grows as the minimum stock ratio increases, since a higher cash stock level leads to more excessive cash and more interest. The dashed line 604 represents the cash refill cost. It also increases along with the minimum stock ratio since a higher cash stock level implies more cash refill trips. As represented by the dotted line 606, the out-of-cash penalty cost, on the other hand, decreases when the minimum stock ratio increases. This is because the increased cash stock level reduces the chance of out-of-cash incidents. The overall ATM cash management cost is summed over all three costs and represented by the dash-dotted line 608 at the top. Its concave shape allows for the line search strategy such as the gradient descent method to quickly find the optimal solution. In one aspect, having the cascaded optimization structure to separate between the inner loop optimization and the outer loop optimization reduces the optimization complexity.

The optimal cash refill amount in this example is shown in Table 4, which is achieved when the minimum stock ratio $\alpha=6.1$. This results in the cash interest cost of $1,685, the cash refill cost of $6,500 (for a total of 13 cash refill trips), and the out-of-cash penalty cost of $530. The overall ATM cash management cost is $8,715.

Compared to the initial cash refill solution shown in Table 3, the optimal solution requires a total of $9.6 M cash refill versus $9.2 M in the initial solution. This leads to an insignificant increase for the cash interest cost and the cash refill cost, but helps to bring down the out-of-cash penalty cost significantly (from $4,350 to $530). Despite the similarity between the optimal and initial solution with respect to the refill amount and schedule, it can be seen that the optimal solution tends to refill a bit earlier and a bit more compared to the initial solution. For example, it refills ATM 1 on Day 3 instead of Day 4, and ATM 4 on Day 3 and Day 7 instead of Day 6. These subtle changes, as the result of the outer loop optimization, reduces the ATM cash flow management cost.

TABLE 4

Optimal ATM cash refill amount ($K) calculated from both inner loop optimization and outer loop optimization where minimum stock ratio $\alpha = 6.1$.

|  | ATM 1 | ATM 2 | ATM 3 | ATM 4 | ATM 5 |
|---|---|---|---|---|---|
| Day 1 | 445 | 329 | 540 | 301 | 383 |
| Day 2 | 0 | 0 | 902 | 0 | 942 |
| Day 3 | 1023 | 0 | 0 | 454 | 0 |
| Day 4 | 0 | 693 | 0 | 0 | 0 |
| Day 5 | 0 | 0 | 1666 | 0 | 0 |
| Day 6 | 0 | 0 | 0 | 0 | 1198 |
| Day 7 | 0 | 0 | 0 | 702 | 0 |
| Day 8 | 0 | 0 | 0 | 0 | 0 |
| Day 9 | 0 | 0 | 0 | 0 | 0 |
| Day 10 | 0 | 0 | 0 | 0 | 0 |

In one embodiment, ATM cash flow optimization operates in an iterative manner where the forecast cycle is longer than the execution cycle in order to have a long term perspective. In the above example, a forecast cycle of 10 days (i.e., T=10 is used in the optimization routine as shown in the examples) and an execution cycle of 5 days (i.e., the optimization routine will run every 5 days, for example, instead of daily due to logistics preparation for the cash refill trips) are chosen.

Figures 7, 8:
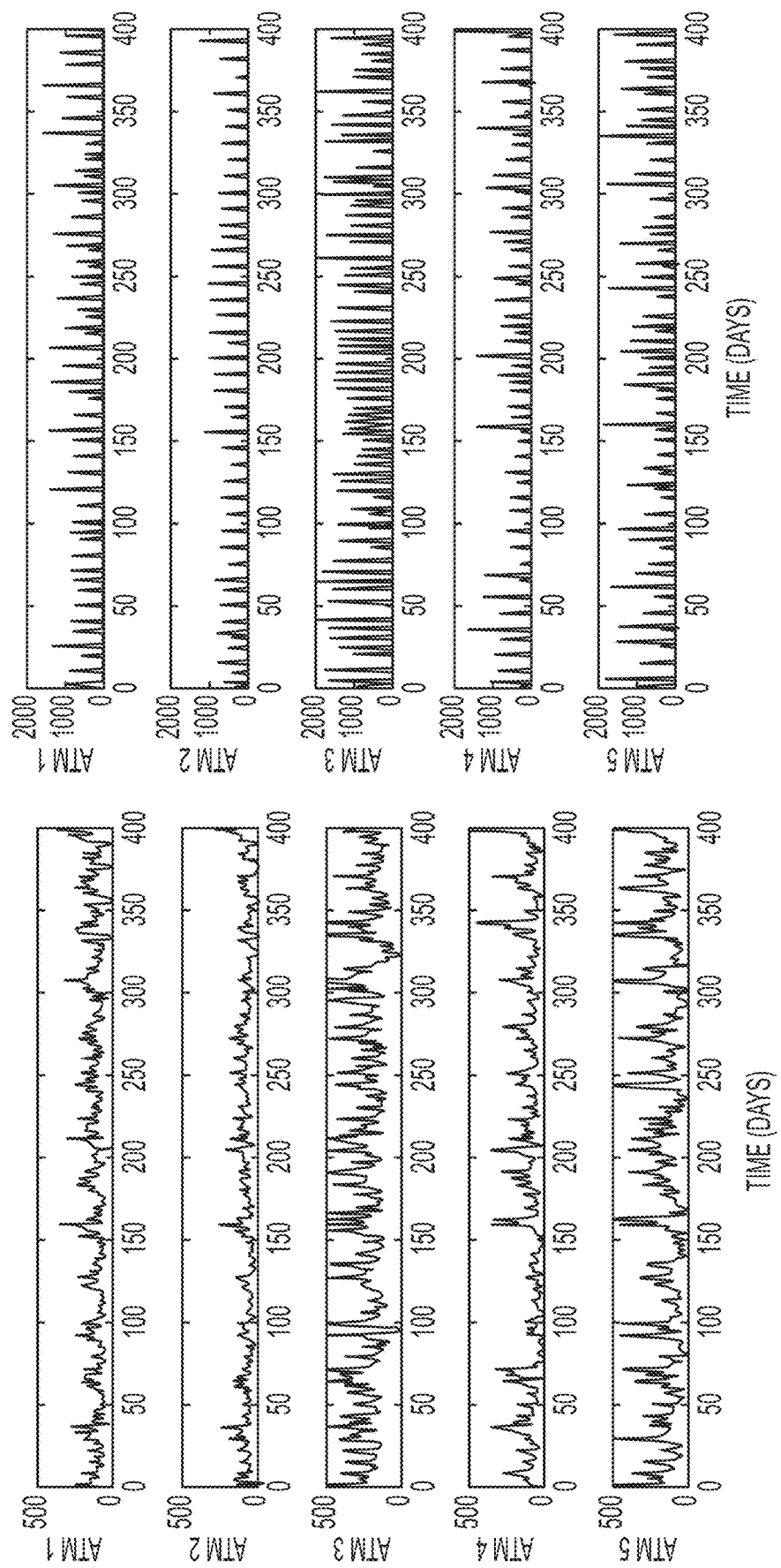
FIG. 7 shows an example chart illustrating the cash withdrawal amount (in the unit of thousand dollars, $K) over a time horizon of 400 days for the 5 ATMs in one embodiment of the present disclosure.
FIG. 8 shows an example chart illustrating the optimal cash refill amount and schedule for the same time period in one embodiment of the present disclosure.

As an example, FIG. 7 shows the cash withdrawal amount (in the unit of thousand dollars, $K) over a time horizon of 400 days for the 5 ATMs. FIG. 8 shows the optimal cash refill amount and schedule for the same time period. Overall, 311 refill trips are scheduled, where ATM 3 has both the highest frequency and the largest amount due to its high cash withdrawal demand.

Figure 9:
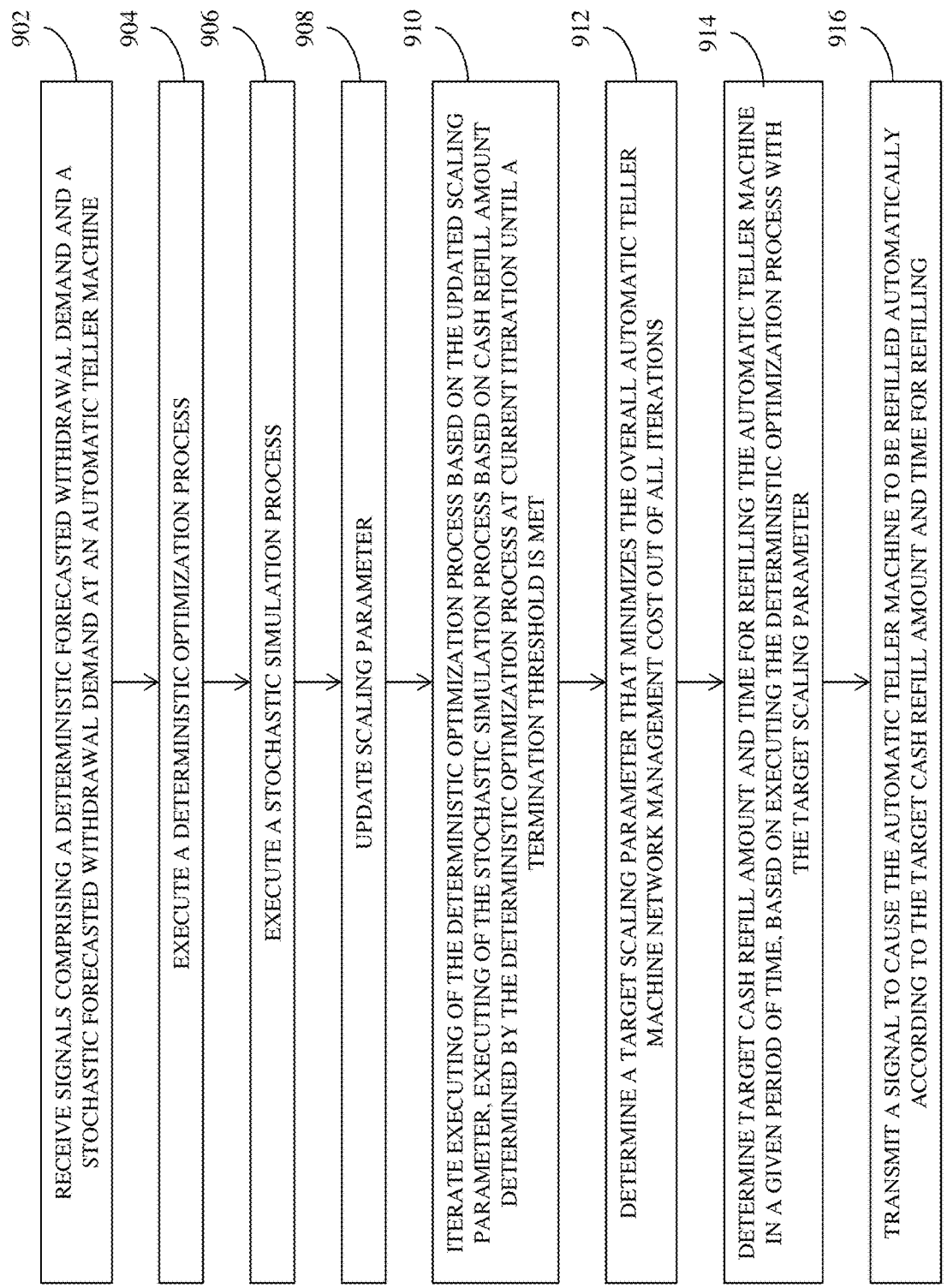
FIG. 9 is a flow diagram illustrating a method of automatic teller machine network management in one embodiment of the present disclosure.

FIG. 9 is a flow diagram illustrating a method of automatic teller machine network management in one embodiment of the present disclosure. At 902, signals are received, for example, including deterministic forecasted withdrawal demand and a stochastic forecasted withdrawal demand at an automatic teller machine.

At 904, a deterministic optimization process is executed at least based on the deterministic forecasted withdrawal demand to determine a cash refill amount that minimizes cash interest cost and cash refill cost subject to a plurality of constraints. For instance, as described above, the plurality of constraints includes at least a cash availability constraint as a function of a scaling parameter that represents a safety margin against an out-of-cash incident.

At 906, a stochastic simulation process is executed to determine an overall automatic teller machine network management cost at least based on the stochastic forecasted withdrawal demand and the cash refill amount determined by the deterministic optimization process. At 908, the scaling parameter is updated and fed into the deterministic optimization process.

At 910, the logic iterates the executing of the deterministic optimization process based on the updated scaling parameter and the executing of the stochastic simulation process based on the cash refill amount determined by the deterministic optimization process at current iteration until a termination threshold is met. For example, if the termination threshold is not met, the scaling parameter is again updated and the executing of the deterministic optimization process and the stochastic simulation process are repeated.

At 912, a target scaling parameter that minimizes the overall automatic teller machine network management cost out of all iterations is determined. For example, a gradient descent method may be employed to find the target scaling parameter. Other techniques may be utilized.

At 914, target cash refill amount and time for refilling the automatic teller machine in a given period of time are determined based on executing the deterministic optimization process with the target scaling parameter.

At 916, a signal is transmitted to cause the automatic teller machine to be refilled automatically according to the target cash refill amount and time for refilling. In one aspect, signals may be transmitted, for example, to update an electronic map or a navigation system map on a vehicle to display paths to the automatic teller machine.

As described above, the deterministic optimization process solves for the target cash refill amount and the time for refilling for each of a plurality of automatic teller machines simultaneously for the given period of time.

In one aspect, the deterministic forecasted withdrawal demand and the stochastic forecasted withdrawal demand at an automatic teller machine are received continuously, for example, based on continuous forecasts performed based on cash withdrawal information received from the automatic teller machine. In one aspect, the method is performed over a plurality of consecutive given periods of time, for example, as a control system that controls ATM network, for example, continuously refilling the ATM machine.

Figure 10:
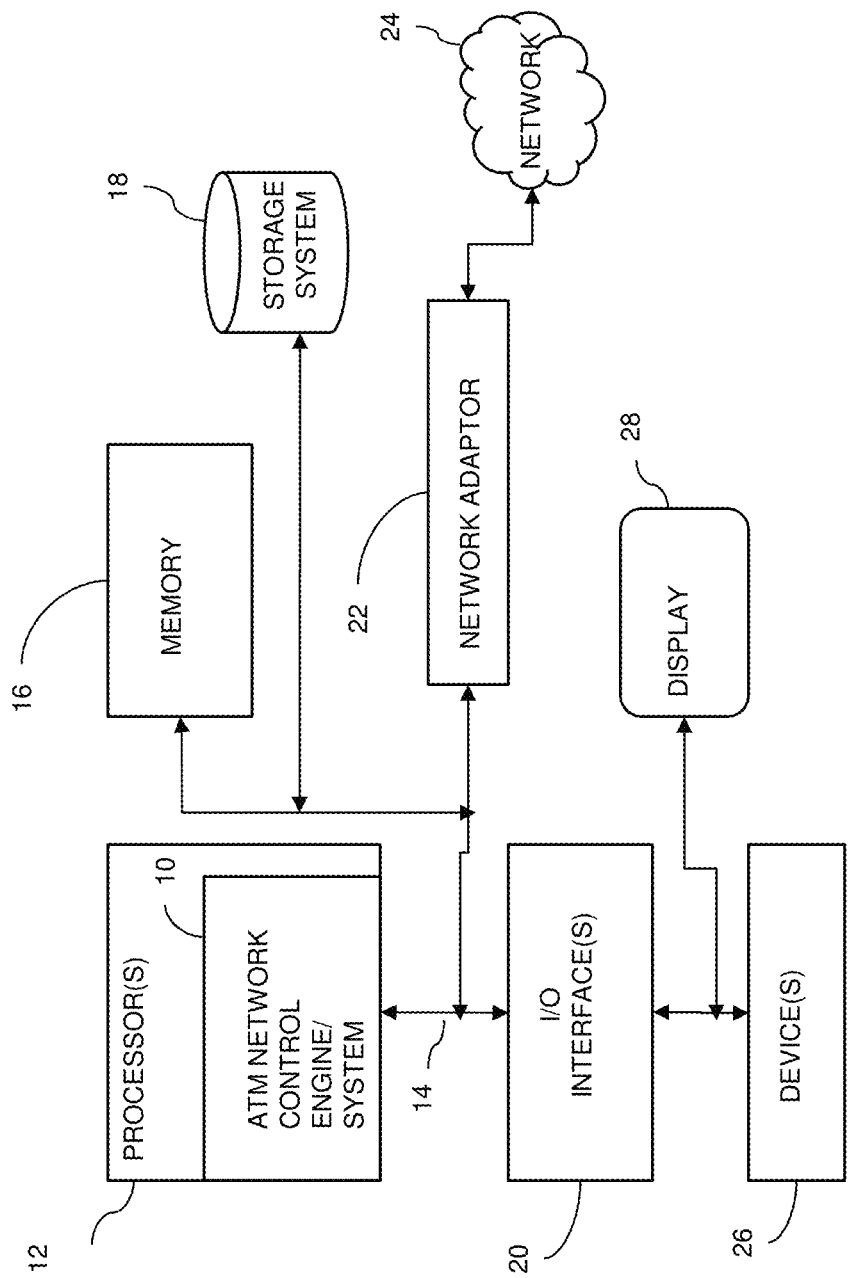
FIG. 10 illustrates a schematic of an example computer or processing system that may implement an ATM network control system in one embodiment of the present disclosure.

FIG. 10 illustrates a schematic of an example computer or processing system that may implement an ATM network control system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An automatic teller machine network control system, comprising:
   a hardware processor operable to receive signals comprising at least a deterministic forecasted withdrawal demand and a stochastic forecasted withdrawal demand at an automatic teller machine;
   the hardware processor further operable to execute a deterministic optimization process of a cascaded optimization framework at least based on the deterministic forecasted withdrawal demand to determine a cash refill amount that minimizes cash interest cost and cash refill cost subject to a plurality of constraints, the plurality of constraints comprising at least a cash availability constraint as a function of a scaling parameter that represents a safety margin against an out-of-cash incident;
   the hardware processor further operable to execute a stochastic simulation process of the cascaded optimization framework to determine an overall automatic teller machine network management cost at least based on the stochastic forecasted withdrawal demand and the cash refill amount determined by the deterministic optimization process, the stochastic simulation processing including at least a Monte Carlo simulation using a random value representing a cash withdrawal and the cash refill amount that is a fixed amount determined by the deterministic optimization process;
   the hardware processor further operable to update the scaling parameter and feed the updated scaling parameter to the deterministic optimization process, and iterate executing of the deterministic optimization process based on the updated scaling parameter and executing of the stochastic simulation process based on the cash refill amount determined by the deterministic optimization process at current iteration until a termination threshold is met;
   the hardware processor further operable to find a target scaling parameter that minimizes the overall automatic teller machine network management cost out of all iterations;
   the hardware processor operable to determine target cash refill amount and time for refilling the automatic teller machine in a given period of time, based on executing the deterministic optimization process executed based on the target scaling parameter; and
   the hardware processor further operable to transmit a signal to cause the automatic teller machine to be refilled automatically according to the target cash refill amount and time for refilling,
   wherein the cascaded optimization framework includes an inner loop optimization including the deterministic optimization process using linear integer programming and an outer loop optimization including the stochastic simulation process, the inner loop optimization minimizing deterministic cash interest and cash refill costs, and the outer loop optimization minimizing stochastic cash interest, cash refill and out-of-cash penalty costs, the outer loop optimization outputting minimum stock ratio representing a trade-off needed on having excessive cash, the minimum stock ratio fed back to the inner loop optimization to determine the target cash refill amount and time for refilling.

2. The system of claim 1, wherein the overall automatic teller machine network management cost comprises at least a sum of the cash interest cost, the cash refill cost and an out-of-cash penalty cost.

3. The system of claim 1, wherein the deterministic optimization process solves for the target cash refill amount and the time for refilling for each of a plurality of automatic teller machines simultaneously for the given period of time.

4. The system of claim 1, wherein the plurality of constraints further comprises at least cash stock constraint representing how periodic cash stock levels are affected by periodic cash refill and periodic cash withdrawal.

5. The system of claim 1, wherein the plurality of constraints further comprises at least a cash budget constraint representing an inequality constraint that limits periodic cash refill for the automatic teller machine.

6. The system of claim 1, wherein the plurality of constraints further comprises at least automatic teller machine capacity constraint ensuring that the cash refill amount does not exceed capacity of the automatic teller machine.

7. A method of providing automatic teller machine network management control, the method performed by a processor, comprising:
   receiving signals comprising at least a deterministic forecasted withdrawal demand and a stochastic forecasted withdrawal demand at an automatic teller machine;
   executing a deterministic optimization process of a cascaded optimization framework at least based on the deterministic forecasted withdrawal demand to determine a cash refill amount that minimizes cash interest cost and cash refill cost subject to a plurality of constraints, the plurality of constraints comprising at least a cash availability constraint as a function of a scaling parameter that represents a safety margin against an out-of-cash incident;

executing a stochastic simulation process of the cascaded optimization framework to determine an overall automatic teller machine network management cost at least based on the stochastic forecasted withdrawal demand and the cash refill amount determined by the deterministic optimization process, the stochastic simulation processing including at least a Monte Carlo simulation using a random value representing a cash withdrawal and the cash refill amount that is a fixed amount determined by the deterministic optimization process;

updating the scaling parameter and feeding the updated scaling parameter to the deterministic optimization process;

iterating the executing of the deterministic optimization process based on the updated scaling parameter and the executing of the stochastic simulation process based on the cash refill amount determined by the deterministic optimization process at current iteration until a termination threshold is met;

determining a target scaling parameter that minimizes the overall automatic teller machine network management cost out of all iterations;

determining target cash refill amount and time for refilling the automatic teller machine in a given period of time, based on executing the deterministic optimization process with the target scaling parameter; and transmitting a signal to cause the automatic teller machine to be refilled automatically according to the target cash refill amount and time for refilling, wherein the cascaded optimization framework includes an inner loop optimization including the deterministic optimization process using linear integer programming and an outer loop optimization including the stochastic simulation process, the inner loop optimization minimizing deterministic cash interest and cash refill costs, and the outer loop optimization minimizing stochastic cash interest, cash refill and out-of-cash penalty costs, the outer loop optimization outputting minimum stock ratio representing a trade-off needed on having excessive cash, the minimum stock ratio fed back to the inner loop optimization to determine the target cash refill amount and time for refilling.

8. The method of claim 7, wherein the overall automatic teller machine network management cost comprises at least a sum of the cash interest cost, the cash refill cost and an out-of-cash penalty cost.

9. The method of claim 7, wherein the deterministic optimization process determines the target cash refill amount and the time for refilling for each of a plurality of automatic teller machines over the given period of time simultaneously.

10. The method of claim 7, wherein the plurality of constraints further comprises at least cash stock constraint representing how periodic cash stock levels are affected by periodic cash refill and periodic cash withdrawal.

11. The method of claim 7, wherein the plurality of constraints further comprises at least cash budget constraint representing an inequality constraint that limit periodic cash refill for the automatic teller machine.

12. The method of claim 7, wherein the plurality of constraints further comprises at least automatic teller machine capacity constraint ensuring that the cash refill amount does not exceed capacity of the automatic teller machine.

13. A computer program product for providing automatic teller machine network management control, the computer program product comprising a computer readable storage medium having program instructions embodied therewith, the program instructions executable by a device to cause the device to:

receive signals comprising at least a deterministic forecasted withdrawal demand and a stochastic forecasted withdrawal demand at an automatic teller machine;

execute a deterministic optimization process of a cascaded optimization framework at least based on the deterministic forecasted withdrawal demand to determine a cash refill amount that minimizes cash interest cost and cash refill cost subject to a plurality of constraints, the plurality of constraints comprising at least a cash availability constraint as a function of a scaling parameter that represents a safety margin against an out-of-cash incident;

execute a stochastic simulation process of the cascaded optimization framework to determine an overall automatic teller machine network management cost at least based on the stochastic forecasted withdrawal demand and the cash refill amount determined by the deterministic optimization process, the stochastic simulation processing including at least a Monte Carlo simulation using a random value representing a cash withdrawal and the cash refill amount that is a fixed amount determined by the deterministic optimization process;

update the scaling parameter and feeding the updated scaling parameter to the deterministic optimization process;

iterate the executing of the deterministic optimization process based on the updated scaling parameter and the executing of the stochastic simulation process based on the cash refill amount determined by the deterministic optimization process at current iteration until a termination threshold is met;

determine a target scaling parameter that minimizes the overall automatic teller machine network management cost out of all iterations;

determine target cash refill amount and time for refilling the automatic teller machine in a given period of time, based on executing the deterministic optimization process with the target scaling parameter; and transmit a signal to cause the automatic teller machine to be refilled automatically according to the target cash refill amount and time for refilling, wherein the cascaded optimization framework includes an inner loop optimization including the deterministic optimization process using linear integer programming and an outer loop optimization including the stochastic simulation process, the inner loop optimization minimizing deterministic cash interest and cash refill costs, and the outer loop optimization minimizing stochastic cash interest, cash refill and out-of-cash penalty costs, the outer loop optimization outputting minimum stock ratio representing a trade-off needed on having excessive cash, the minimum stock ratio fed back to the inner loop optimization to determine the target cash refill amount and time for refilling.

14. The computer program product of claim 13, wherein the overall automatic teller machine network management cost comprises a sum of the cash interest cost, the cash refill cost and an out-of-cash penalty cost.

15. The computer program product of claim 13, wherein the deterministic optimization process determines the target cash refill amount and the time for refilling for each of a plurality of automatic teller machines over the given period of time simultaneously.

16. The computer program product of claim 13, wherein the plurality of constraints further comprises cash stock constraint representing how periodic cash stock levels are affected by periodic cash refill and periodic cash withdrawal.

17. The computer program product of claim 13, wherein the plurality of constraints further comprises cash budget constraint representing an inequality constraint that limit periodic cash refill for the automatic teller machine.

18. The computer program product of claim 13, wherein the plurality of constraints further comprises automatic teller machine capacity constraint ensuring that the cash refill amount does not exceed capacity of the automatic teller machine.

19. The computer program product of claim 13, wherein the deterministic forecasted withdrawal demand and the stochastic forecasted withdrawal demand at an automatic teller machine are performed continuously based on cash withdrawal information received from the automatic teller machine, and the method is performed over a plurality of consecutive given periods of time.

* * * * *